US012650083B1

(12) United States Patent
O'Connor et al.

(10) Patent No.: US 12,650,083 B1
(45) Date of Patent: Jun. 9, 2026

(54) PROPULSOR ACTUATION SYSTEM FOR A TURBINE ENGINE AND A METHOD OF OPERATING THE PROPULSOR ACTUATION SYSTEM

(71) Applicant: General Electric Company, Evendale, OH (US)

(72) Inventors: Ethan Patrick O'Connor, Hamilton, OH (US); Austin Flanagan, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/173,145

(22) Filed: Apr. 8, 2025

(51) Int. Cl.
*F01D 7/00* (2006.01)

(52) U.S. Cl.
CPC .......... *F01D 7/00* (2013.01); *F05D 2220/323* (2013.01); *F05D 2260/74* (2013.01)

(58) Field of Classification Search
CPC ... F01D 7/00; F05D 2220/323; F05D 2260/74
See application file for complete search history.

(56) References Cited

U.S. PATENT DOCUMENTS 2,958,382 A 11/1960 Covert et al.
3,922,852 A 12/1975 Drabek
4,732,538 A * 3/1988 Wollenweber ............ F01D 7/00 416/129
5,174,677 A 12/1992 Doolin et al.
5,282,719 A * 2/1994 McCarty ................ B64C 11/44 416/165
5,520,515 A 5/1996 Bailey et al.
5,993,152 A * 11/1999 Schilling ............... F01D 17/162 415/155
9,809,300 B1 11/2017 Kuentzel et al.
10,443,412 B2 * 10/2019 Niergarth ................ B64C 11/44
10,689,094 B2 6/2020 Patsouris et al.
2006/0067822 A1 3/2006 D'Anna
(Continued)

FOREIGN PATENT DOCUMENTS

FR 3127269 A 3/2023
FR 3130896 A 6/2023
(Continued)

*Primary Examiner* — Aaron R Eastman
(74) *Attorney, Agent, or Firm* — Venable LLP; Michele V. Frank

(57) ABSTRACT

A propulsor actuation system for a turbine engine that includes a plurality of propulsor blades each rotatable about a pitch axis. The propulsor actuation system includes one or more actuators having a yoke, and a minimum pitch lockout system. The minimum pitch lockout system includes a locking mechanism movable to a closed position to prevent the yoke from moving axially beyond the locking mechanism such that the propulsor blades are rotatable in a first pitch range, and movable to an open position to allow the yoke to move axially beyond the locking mechanism such that the propulsor blades are rotatable in a second pitch range. A method of operating the propulsor actuation system includes preventing the yoke from moving axially beyond the locking mechanism in the closed position, opening the locking mechanism to the open position, and moving the yoke axially beyond the locking mechanism in the open position.

20 Claims, 6 Drawing Sheets

(56) References Cited

U.S. PATENT DOCUMENTS

| | | | | |
|---|---|---|---|---|
| 2017/0276012 | A1* | 9/2017 | Chandler | F04D 29/563 |
| 2017/0276014 | A1* | 9/2017 | Chandler | F01D 9/04 |
| 2019/0024531 | A1* | 1/2019 | Littler | F01D 17/162 |
| 2023/0126551 | A1* | 4/2023 | Niergarth | F02K 3/072<br>60/226.1 |
| 2024/0151240 | A1* | 5/2024 | Altamura | B64C 11/36 |
| 2024/0240566 | A1* | 7/2024 | Altamura | B64C 11/385 |

FOREIGN PATENT DOCUMENTS

| | | | |
|---|---|---|---|
| FR | 3130897 | A | 6/2023 |
| FR | 3133367 | A | 9/2023 |
| FR | 3133368 | A | 9/2023 |
| GB | 781356 | A | 8/1957 |

* cited by examiner

PROPULSOR ACTUATION SYSTEM FOR A TURBINE ENGINE AND A METHOD OF OPERATING THE PROPULSOR ACTUATION SYSTEM

TECHNICAL FIELD

The present disclosure relates generally to propulsor actuation systems for turbine engines.

BACKGROUND

Turbine engines, for example, for an aircraft, generally include a propulsor having propulsor blades and a turbo-engine arranged in flow communication with one another. Some turbine engines include a propulsor actuation system for actuating the propulsor blades of the propulsor.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
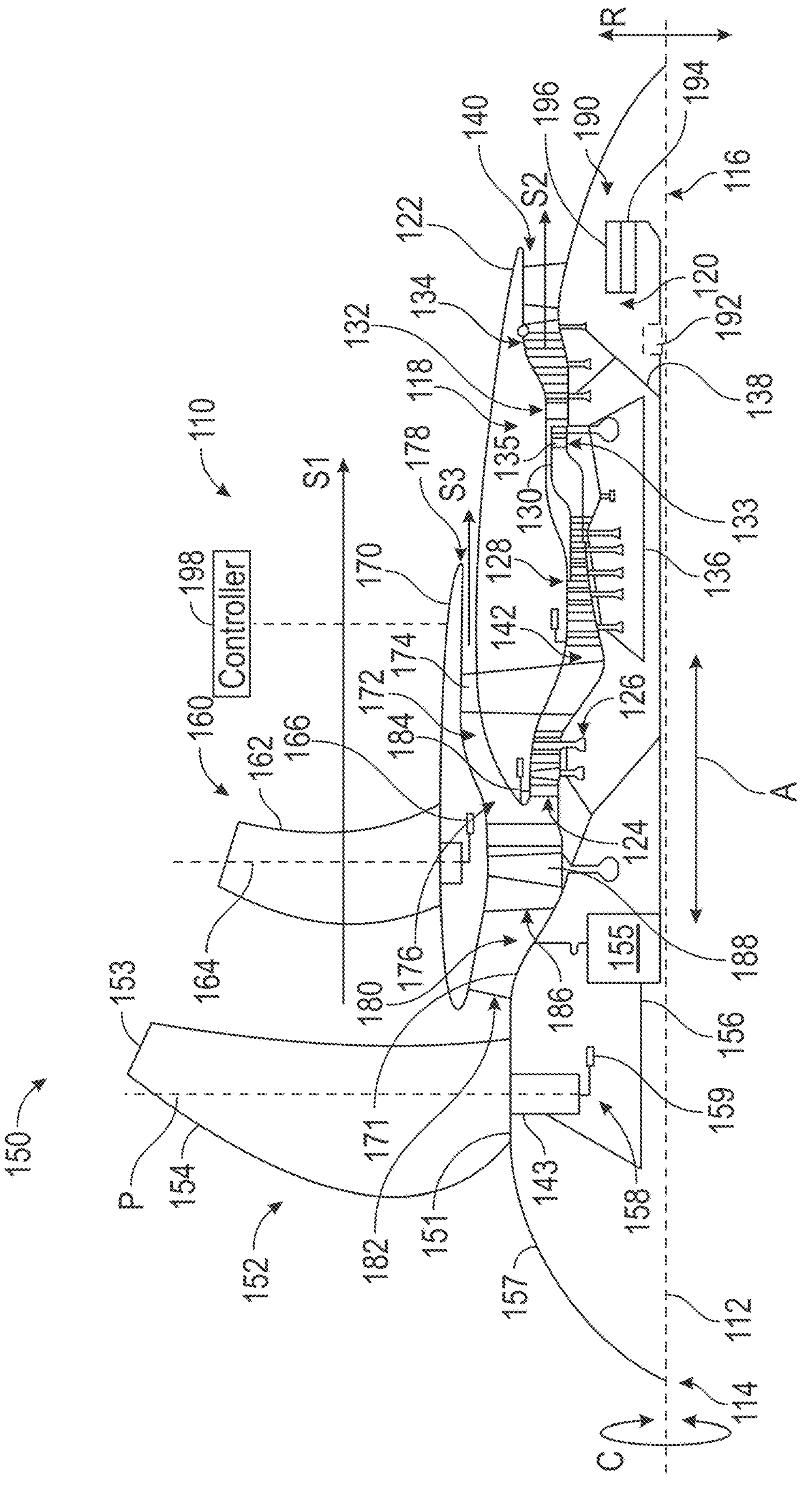
FIG. 1 is a schematic view of a turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. More particularly, forward and aft are used herein with reference to a direction of travel of the vehicle and a direction of propulsive thrust of the gas turbine engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel (i.e., parallel to within five degrees) to a longitudinal centerline axis of the turbine engine. Moreover, the terms "radial" and "radially" refer to directions and orientations that extend substantially perpendicular to the longitudinal centerline axis of the turbine engine. In addition, as used herein, the terms "circumferential" and "circumferentially" refer to directions and orientations that extend arcuately about the centerline of the turbine engine.

As used herein, a "propulsor" is a component that rotates and generates thrust. The propulsor can be a fan. For example, the propulsor can be a fan of a turbofan engine that is drivingly coupled to the turbo-engine such that rotation of the components of the turbo-engine causes the propulsor to rotate and to generate thrust. The propulsor can be a propeller of a turboprop engine.

As used herein, a "minimum pitch position" or a "minimum pitch angle" refers to a predetermined pitch of the propulsor blades for generating forward thrust while the aircraft is in flight.

As used herein, a "reverse thrust position" or a "reverse pitch position" refers to a pitch of the propulsor blades for generating reverse thrust with the turbine engine.

As used herein, a "feather position" refers to a pitch angle of the propulsor blades that is substantially parallel to an air flow passing through the propulsor.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides for turbine engines for aircraft that have a variable pitch propulsor. Such engines include a propulsor actuation system that includes one or more actuators for changing a pitch of propulsor blades of the variable pitch propulsor. The propulsor actuation system typically includes actuators that are coupled to the propulsor blades and actuation of the actuators causes the propulsor blades to rotate about a blade pitch axis to change the pitch of the propulsor blades. Some propulsor actuation systems are designed for turbofan engines that include a fan or for turboprop engines that include a propeller.

Some propulsor actuation systems include a piston as part of the actuators that moves axially to change the pitch of the propulsor blades. Such systems can include a pitch lock system that locks the pitch of the blades at a current pitch, for example, in case of a failure of the propulsor actuation system. Some propulsor actuation systems also include a counterweight to help rotate the propulsor blades to change the pitch from a first pitch to a second pitch. The counterweight helps to ensure that the propulsor blades do not rotate beyond the second pitch. Some propulsor actuation systems do not include a counterweight.

While the aircraft is in flight, the propulsor actuation system can change the pitch of the propulsor blades in a first pitch range from a feather position (e.g., a pitch angle of the propulsor blades that is substantially parallel to an air flow passing through the propulsor) to a minimum pitch position. The minimum pitch position is a predetermined pitch of the propulsor blades for generating forward thrust while the aircraft is in flight. When the aircraft lands, the propulsor actuation system can change the pitch to less than the minimum pitch position to a reverse pitch position for generating reverse thrust to help slow down the aircraft. In some instances, especially in propulsor actuation systems without a counterweight, the pitch of the propulsor blades may change to less than the minimum pitch position while the aircraft is in flight, due to excessive drag on the propulsor blades from the air that passes through the propulsor during the flight.

Accordingly, the present disclosure provides for a minimum pitch lockout system for preventing the propulsor blades from being pitched to less than the minimum pitch position while the aircraft is in flight. In particular, the minimum pitch lockout system includes an electro-mechanical locking mechanism to prevent the propulsor actuation system from moving axially beyond the minimum pitch position and protecting against a hazardous excessive drag risk while the aircraft is in flight. The minimum pitch lockout system includes a solenoid, also referred to as a lockout mechanism actuator, that moves a pin that is located in a rotating reference frame of the propulsor actuation system. The pin is passively engaged (extended) during operation (while the aircraft is in flight) and physically prevents a yoke of the piston from traveling past a certain pitch. In particular, the pin prevents the yoke from moving past the pin. The pin is positioned at an axial location that corresponds to the minimum pitch position such that the propulsor actuation system is prevented from pitching the propulsor blades less than the minimum pitch position while pin is extended. When the solenoid is energized, the solenoid retracts the pin, allowing the yoke to move past the pin, and, thus, allowing the propulsor actuation system to change the pitch of the propulsor blades to less than the minimum pitch position. For example, the propulsor actuation system can change the pitch to the reverse thrust position while the pin is retracted. The solenoid can receive electric power from a slip ring that is located close to the propulsor blades (e.g., at the propulsor disk).

Therefore, the propulsor actuation system of the present disclosure prevents unintended pitch changes less than the minimum pitch position while the aircraft is in flight. Thus, the propulsor actuation system prevents excessive drag on the propulsor during the flight. The minimum pitch lockout system is particularly useful for propulsor actuation systems without a counterweight that prevents unintended pitch changes. The minimum pitch lockout system can require two signals to actuate the pins, such as, for example, the solenoid being energized and a signal that the aircraft is on the ground. Such a configuration ensures the pins are not retracted during a flight and cause a hazardous incident. The solenoid being in the rotating reference frame of the propulsor actuation system allows the solenoid to actuate the pins while the propulsor actuation system is rotating with the fan shaft. Further, preventing axial movement with the pins allows for a more precise control of the propulsor actuation system due to lesser deviations per inch of movement in the axial direction as compared to movements in the circumferential direction.

Referring now to the drawings, FIG. 1 is a schematic view of an exemplary turbine engine 110 for an aircraft that may incorporate one or more embodiments of the present disclosure. More specifically, in the illustrated embodiment, the turbine engine 110 is an unducted, three-stream, turbofan engine for an aircraft. In this way, the turbine engine 110 is an unducted fan engine or an open fan engine. The turbine engine 110 is a "three-stream engine" in that its architecture provides three distinct streams (labeled S1, S2, and S3) of thrust-producing airflow during operation, as detailed further below.

As shown in FIG. 1, the turbine engine 110 defines an axial direction A, a radial direction R, and a circumferential direction C. Moreover, the turbine engine 110 defines a longitudinal centerline axis 112 that extends along the axial direction A. In general, the axial direction A extends parallel to the longitudinal centerline axis 112, the radial direction R extends outward from, and inward to, the longitudinal centerline axis 112 in a direction orthogonal to the axial direction A, and the circumferential direction C extends three hundred sixty degrees (360°) around the longitudinal centerline axis 112. The turbine engine 110 extends between a forward end 114 and an aft end 116, e.g., along the axial direction A.

The turbine engine 110 includes a turbo-engine 120 and a propulsor assembly 150, e.g., a fan assembly, positioned upstream thereof. Generally, the turbo-engine 120 includes a compressor section, a combustion section, a turbine section, and an exhaust section. Particularly, as shown in FIG. 1, the turbo-engine 120 includes an engine core 118 and a core cowl 122 that annularly surrounds the turbo-engine 120. The turbo-engine 120 and the core cowl 122 define a core inlet 124 having an annular shape that is annular about the longitudinal centerline axis 112. The core cowl 122 further encloses and supports a low-pressure (LP) compressor 126 (also referred to as a booster) for pressurizing air that enters the turbo-engine 120 through the core inlet 124. A high-pressure (HP) compressor 128 receives pressurized air from the LP compressor 126 and further increases the pressure of the air. The pressurized air flows downstream to a combustor 130 where fuel is injected into the pressurized air and ignited to raise the temperature and the energy level of the pressurized air, thereby generating combustion gases.

With continued reference to FIG. 1, the combustion gases flow from the combustor 130 downstream to a high-pressure (HP) turbine 132. The HP turbine 132 drives the HP compressor 128 through a first shaft, also referred to as a high-pressure (HP) shaft 136 (also referred to as a "high-speed shaft"). In this regard, the HP turbine 132 is drivingly coupled with the HP compressor 128. Together, the HP compressor 128, the combustor 130, and the HP turbine 132 define the engine core 118. The combustion gases then flow to a power turbine or a low-pressure (LP) turbine 134. The LP turbine 134 drives the LP compressor 126 and components of the propulsor assembly 150 through a second shaft, also referred to as a low-pressure (LP) shaft 138 (also referred to as a "low-speed shaft"). In this regard, the LP turbine 134 is drivingly coupled with the LP compressor 126 and components of the propulsor assembly 150. The LP shaft 138 is coaxial with the HP shaft 136 in the embodiment of FIG. 1. After driving each of the HP turbine 132 and the LP turbine 134, the combustion gases exit the turbo-engine 120 through a core exhaust nozzle 140. The turbo-engine 120 defines a core flowpath, also referred to as a core duct 142, that extends between the core inlet 124 and the core exhaust nozzle 140. The core duct 142 is an annular duct positioned generally inward of the core cowl 122 along the radial direction R.

The propulsor assembly 150 includes a propulsor 152, also referred to as a primary propulsor or a fan. For the embodiment of FIG. 1, the propulsor 152 is an open rotor fan, also referred to as an unducted fan. However, in other embodiments, the propulsor 152 may be a ducted fan, e.g., by a fan casing or a nacelle circumferentially surrounding the fan. The propulsor 152 includes a plurality of propulsor blades 154 (only one shown in FIG. 1), e.g., a plurality of fan blades that extends in the radial direction R from a propulsor root 151 to a propulsor tip 153. The plurality of propulsor blades 154 is rotatable about the longitudinal centerline axis 112 via a propulsor shaft 156, e.g., a fan shaft. As shown in FIG. 1, the propulsor shaft 156 is coupled with the LP shaft 138 via a speed reduction gearbox or a power gearbox, also referred to as a gearbox assembly 155, e.g., in an indirect-drive configuration.

The gearbox assembly 155 is shown schematically in FIG. 1. The gearbox assembly 155 includes a plurality of gears for adjusting the rotational speed of the propulsor shaft 156 and, thus, the propulsor 152 relative to the LP shaft 138 to a more efficient rotational propulsor speed. The gearbox assembly 155 may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. In some embodiments, the gearbox assembly 155 has a gear ratio of 4:1 to 10:1 for an unducted fan engine (e.g., the turbine engine 110). The gearbox may be a single stage gearbox or a compound gearbox (e.g., having a plurality of stages). The LP shaft 138, the gearbox assembly 155, and the propulsor shaft 156 are disposed in an in-line configuration such that the LP shaft 138, the gearbox assembly 155, and the propulsor shaft 156 are coaxial, and are each disposed about the longitudinal centerline axis 112.

The propulsor blades 154 can be arranged in equal spacing around the longitudinal centerline axis 112. Each propulsor blade 154 extends outwardly from a disk 143 (see FIG. 2) generally along the radial direction R. The disk 143 is covered by a propulsor hub 157 that is rotatable and aerodynamically contoured to promote an airflow through the plurality of propulsor blades 154. Each propulsor blade 154 has a root and a tip, and a span defined therebetween. Each of the plurality of propulsor blades 154 defines a blade pitch axis P. For the embodiment of FIG. 1, each of the plurality of propulsor blades 154 of the propulsor 152 is rotatable about their respective blade pitch axis P, e.g., in unison with one another. A propulsor actuation system 158 controls one or more actuators 159 to pitch the propulsor blades 154 about their respective blade pitch axis P. The propulsor actuation system 158 is disposed within the propulsor hub 157.

The propulsor assembly 150 further includes a propulsor guide vane array 160 that includes a plurality of propulsor guide vanes 162 (only one shown in FIG. 1) disposed around the longitudinal centerline axis 112. For the embodiment of FIG. 1, the plurality of propulsor guide vanes 162 is not rotatable about the longitudinal centerline axis 112. Each of the plurality of propulsor guide vanes 162 has a root and a tip, and a span defined therebetween. The plurality of propulsor guide vanes 162 can be unshrouded, as shown in FIG. 1, or can be shrouded, e.g., by an annular shroud spaced outward from the tips of the propulsor guide vanes 162 along the radial direction R. Each of the plurality of propulsor guide vanes 162 defines a vane pitch axis 164. For the embodiment of FIG. 1, each of the plurality of propulsor guide vanes 162 of the propulsor guide vane array 160 is rotatable about their respective vane pitch axis 164, e.g., in unison with one another. One or more actuators 166 are controlled to pitch the plurality of propulsor guide vanes 162 about their respective vane pitch axis 164. In other embodiments, each of the plurality of propulsor guide vanes 162 is fixed or is unable to be pitched about the vane pitch axis 164. The plurality of propulsor guide vanes 162 is mounted to a propulsor cowl 170.

The propulsor cowl 170 annularly encases at least a portion of the core cowl 122 and is generally positioned outward of the core cowl 122 along the radial direction R. Particularly, a downstream section of the propulsor cowl 170 extends over a forward portion of the core cowl 122 to define a propulsor flowpath, also referred to as a propulsor duct 172. Incoming air enters through the propulsor duct 172 through a propulsor duct inlet 176 and exits through a propulsor exhaust nozzle 178 to produce propulsive thrust. The propulsor duct 172 is an annular duct positioned generally outward of the core duct 142 along the radial direction R. The propulsor cowl 170 and the core cowl 122 are connected together and supported by a plurality of struts 174 (only one shown in FIG. 1) that extends substantially radially and are circumferentially spaced about the longitudinal centerline axis 112. Each strut of the plurality of struts 174 is aerodynamically contoured to direct air flowing thereby. Other struts, in addition to the plurality of struts 174, can be used to connect and to support the propulsor cowl 170 and the core cowl 122.

The turbine engine 110 also defines or includes an inlet duct 180. The inlet duct 180 extends between an engine inlet 182 and the core inlet 124 and the propulsor duct inlet 176. The engine inlet 182 is defined generally at the forward end of the propulsor cowl 170 and is positioned between the propulsor 152 and the propulsor guide vane array 160 along the axial direction A. The inlet duct 180 is an annular duct that is positioned inward of the propulsor cowl 170 along the radial direction R. Air flowing downstream along the inlet duct 180 is split, not necessarily evenly, into the core duct 142 and the propulsor duct 172 by a splitter 184 of the core cowl 122. The inlet duct 180 is wider than the core duct 142 along the radial direction R. The inlet duct 180 is also wider than the propulsor duct 172 along the radial direction R.

In the illustrated embodiment, the propulsor assembly 150 also includes a mid-fan 186, which includes a plurality of mid-fan blades 188 (only one shown in FIG. 1) that is rotatable, e.g., about the longitudinal centerline axis 112. The mid-fan 186 is drivingly coupled with the LP turbine 134 via the LP shaft 138. The plurality of mid-fan blades 188 can be arranged in equal circumferential spacing about the longitudinal centerline axis 112. The plurality of mid-fan blades 188 is annularly surrounded (e.g., ducted) by the propulsor cowl 170. In this regard, the mid-fan 186 is positioned inward of the propulsor cowl 170 along the radial direction R. The mid-fan 186 is positioned within the inlet duct 180 upstream of both the core duct 142 and the propulsor duct 172. A ratio of a span of a propulsor blade 154 to that of a mid-fan blade 188 (a span is measured from a root to tip of the respective blade) is greater than 2:1 and less than 10:1, to achieve the desired benefits of the third stream (S3), particularly, the additional thrust third stream (S3) offers to the engine, which can enable a lesser diameter propulsor blade (benefits engine installation).

Accordingly, air flowing through the inlet duct 180 flows across the plurality of mid-fan blades 188 and is accelerated downstream thereof. At least a portion of the air accelerated by the mid-fan blades 188 flows into the propulsor duct 172 and is ultimately exhausted through the propulsor exhaust nozzle 178 to produce propulsive thrust. Also, at least a portion of the air accelerated by the plurality of mid-fan blades 188 flows into the core duct 142 and is ultimately exhausted through the core exhaust nozzle 140 to produce propulsive thrust. Generally, the mid-fan 186 is a compression device positioned downstream of the engine inlet 182. The mid-fan 186 is operable to accelerate air into the propulsor duct 172, also referred to as a secondary bypass passage.

During operation of the turbine engine 110, an initial airflow or an incoming airflow passes through the propulsor blades 154 of the propulsor 152 and splits into a first airflow and a second airflow. The first airflow bypasses the engine inlet 182 and flows generally along the axial direction A outward of the propulsor cowl 170 along the radial direction R. The first airflow accelerated by the propulsor blades 154 passes through the propulsor guide vanes 162 and continues downstream thereafter to produce a primary propulsion stream or a first thrust stream S1. A majority of the net thrust produced by the turbine engine 110 is produced by the first thrust stream S1. The second airflow enters the inlet duct 180 through the engine inlet 182.

The second airflow flowing downstream through the inlet duct 180 flows through the plurality of mid-fan blades 188 of the mid-fan 186 and is consequently compressed. The second airflow flowing downstream of the mid-fan blades 188 is split by the splitter 184 located at the forward end of the core cowl 122. Particularly, a portion of the second airflow flowing downstream of the mid-fan 186 flows into the core duct 142 through the core inlet 124. The portion of the second airflow that flows into the core duct 142 is progressively compressed by the LP compressor 126 and the HP compressor 128 and is ultimately discharged into the combustion section. The discharged pressurized air stream flows downstream to the combustor 130 where fuel is introduced to generate combustion gases or products.

The combustor 130 defines an annular combustion chamber that is generally coaxial with the longitudinal centerline axis 112. The combustor 130 receives pressurized air from the HP compressor 128 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle 133 of the HP turbine 132. The first stage turbine nozzle 133 is defined by an annular flow channel that includes a plurality of radially extending, circumferentially-spaced nozzle vanes 135 that turn the combustion gases so that the combustion gases flow angularly and impinge upon first stage turbine blades of the HP turbine 132. The combustion gases exit the HP turbine 132 and flow through the LP turbine 134, and exit the core duct 142 through the core exhaust nozzle 140 to produce a core air stream, also referred to as a second thrust stream S2. As noted above, the HP turbine 132 drives the HP compressor 128 via the HP shaft 136, and the LP turbine 134 drives the LP compressor 126, the propulsor 152, and the mid-fan 186 via the LP shaft 138.

The other portion of the second airflow flowing downstream of the mid-fan 186 is split by the splitter 184 into the propulsor duct 172. The air enters the propulsor duct 172 through the propulsor duct inlet 176. The air flows generally along the axial direction A through the propulsor duct 172 and is ultimately exhausted from the propulsor duct 172 through the propulsor exhaust nozzle 178 to produce a third stream, also referred to as the third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and, thereby, a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The turbine engine 110 depicted in FIG. 1 is by way of example only. In other embodiments, the turbine engine 110 may have other suitable configurations. For example, the propulsor 152 can be ducted by a fan casing or a nacelle such that a bypass passage is defined between the fan casing and the propulsor cowl 170. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turboprop, or turbine engines defining two streams (e.g., a bypass stream and a core air stream).

Further, for the depicted embodiment of FIG. 1, the turbine engine 110 includes an electric machine 190 (e.g., a motor-generator) operably coupled with a rotating component thereof. In this regard, the turbine engine 110 is a hybrid-electric propulsion machine. Particularly, as shown in FIG. 1, the electric machine 190 is operatively coupled with the LP shaft 138. The electric machine 190 can be mechanically connected to the LP shaft 138, either directly, or indirectly, e.g., by way of a gearbox assembly 192 (shown schematically in FIG. 1). Further, although, in this embodiment, the electric machine 190 is operatively coupled with the LP shaft 138 at an aft end of the LP shaft 138, the electric machine 190 can be coupled with the LP shaft 138 at any suitable location or can be coupled to other rotating components of the turbine engine 110, such as the HP shaft 136 or the LP shaft 138. For instance, in some embodiments, the electric machine 190 can be coupled with the LP shaft 138 and positioned forward of the mid-fan 186 along the axial direction A. In some embodiments, the turbine engine 110 of FIG. 1 can include a plurality of electric machines.

In some embodiments, the electric machine 190 can be an electric motor operable to drive or to motor the LP shaft 138. In other embodiments, the electric machine 190 can be an electric generator operable to convert mechanical energy into electrical energy. In this way, electrical power generated by the electric machine 190 can be directed to various engine systems or aircraft systems. In some embodiments, the electric machine 190 can be a motor/generator with dual functionality. The electric machine 190 includes a rotor 194 and a stator 196. The rotor 194 is coupled to the LP shaft 138 and rotates with rotation of the LP shaft 138. In this way, the rotor 194 rotates with respect to the stator 196, thereby generating electrical power. Although the electric machine 190 has been described and illustrated in FIG. 1 as having a particular configuration, the present disclosure may apply to electric machines having alternative configurations. For instance, the rotor 194 or the stator 196 may have different configurations or may be arranged in a different manner than illustrated in FIG. 1.

A controller 198 is in communication with the turbine engine 110 for controlling aspects of the turbine engine 110. For example, the controller 198 is in two-way communication with the turbine engine 110 for receiving signals from various sensors and control systems of the turbine engine 110 and for controlling components of the turbine engine 110, as detailed further below. The controller 198, or components thereof, may be located onboard the turbine engine 110, onboard the aircraft, or can be located remote from each of the turbine engine 110 and the aircraft. The controller 198 can be a Full Authority Digital Engine Control (FADEC) that controls aspects of the turbine engine 110.

The controller 198 may be a standalone controller or may be part of an engine controller to operate various systems of the turbine engine 110. In this embodiment, the controller 198 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 198 to perform operations. The controller 198 and, more specifically, the one or more processors are programmed or configured to perform these operations, such as the operations discussed further below. In some embodiments, the instructions can be executed by the one or more processors to cause the one or more processors to complete any of the operations and functions for which the controller 198 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 2:
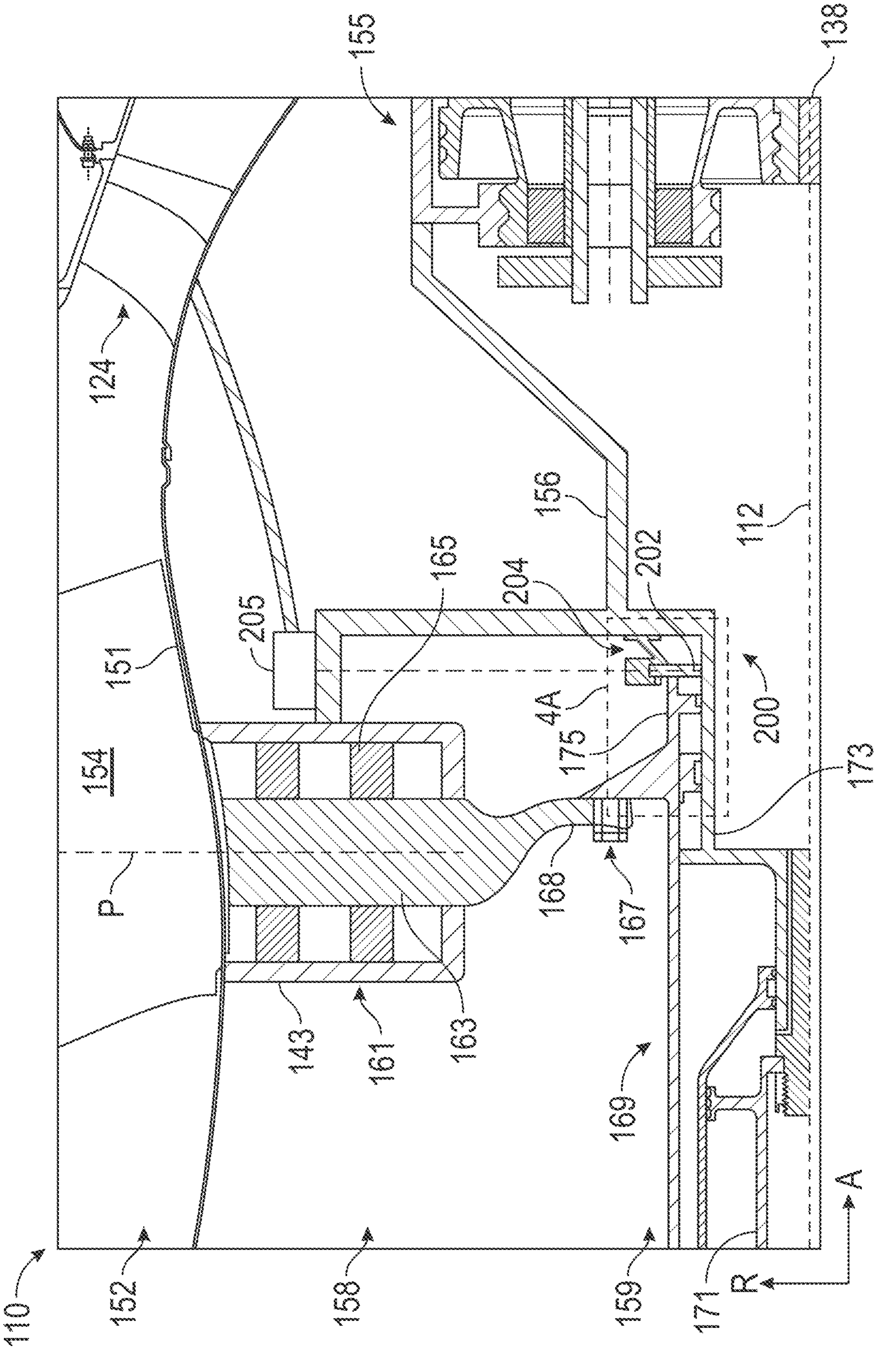
FIG. 2 is a partial, schematic, cross-sectional view of a propulsor actuation system for the turbine engine of FIG. 1, taken along the longitudinal centerline axis of the turbine engine, according to the present disclosure.

FIG. 2 is a partial, schematic, cross-sectional view of the propulsor actuation system 158 for the propulsor 152 of the turbine engine 110, taken along the longitudinal centerline axis 112 of the turbine engine 110, according to the present disclosure. Only the top half of the propulsor actuation system 158 is shown in FIG. 2. However, the propulsor actuation system 158 is symmetrical about the longitudinal centerline axis 112. FIG. 2 also shows the core inlet 124, the gearbox assembly 155, and the propulsor root 151 of the propulsor blades 154. The propulsor actuation system 158 may also be referred to as a fan pitch actuation system (FPAS). The propulsor actuation system 158 controls the pitch (e.g., angle, orientation) of the plurality of propulsor blades 154 about the blade pitch axis P.

FIG. 2 shows the propulsor shaft 156 of the turbine engine 110 (FIG. 1), which is coupled to, and driven by, the LP shaft 138. As shown in FIG. 2, the disk 143 is coupled to (e.g., directly or indirectly), and driven by, the propulsor shaft 156. Each of the plurality of propulsor blades 154 is coupled to, and extends radially outward from, the disk 143. Therefore, as the propulsor shaft 156 is rotated (via the LP shaft 138), the propulsor shaft 156 rotates the disk 143, which rotates the plurality of propulsor blades 154 to generate thrust.

The propulsor actuation system 158 includes a trunnion mechanism 161 including a plurality of trunnions 163. Each propulsor blade 154 is coupled to a respective one of the plurality of trunnions 163. The plurality of trunnions 163 extends through the disk 143. The plurality of trunnions 163 is rotatable within the disk 143. This enables the plurality of propulsor blades 154 to rotate about the blade pitch axis P. As such, the pitch of the plurality of propulsor blades 154 can be changed relative to the flow of a volume of air. The turbine engine 110 also includes one or more thrust bearings 165 disposed between the trunnion 163 and the disk 143 such that the trunnion 163 rotates about the blade pitch axis P with respect to the disk 143. The one or more thrust bearings 165 transmit the load from the respective propulsor blade 154 to a static structure of the turbine engine 110.

Referring still to FIG. 2, the propulsor actuation system 158 includes a plurality of trunnion links 167. The plurality of trunnion links 167 is pivotably coupled to the plurality of trunnions 163. For example, each trunnion link 167 is coupled to an actuation arm 168 of each respective trunnion 163. In this way, the plurality of trunnions 163 is pivotably coupled to the actuation arm 168 such that the plurality of trunnions 163, and, thus, the plurality of propulsor blades 154, can pivot about the blade pitch axis P in unison, as detailed further below.

The propulsor actuation system 158 includes one or more actuators 159. In the illustrated embodiment, the one or more actuators 159 includes a hydraulic cylinder 169, a piston 171, and a piston retainer 173. The piston retainer 173 is coupled (e.g., bolted) to the propulsor shaft 156 such that the piston retainer 173 rotates with the propulsor shaft 156. Therefore, the piston retainer 173 is coupled (e.g., indirectly) to, and rotated by, the LP shaft 138. Also, the piston 171 is coupled to, and extends in a forward direction, from the piston retainer 173. Therefore, the piston 171 also rotates with the piston retainer 173 and the propulsor shaft 156. The hydraulic cylinder 169 also rotates with the piston retainer 173 and the piston 171 but is axially slidable relative to the piston retainer 173 and the piston 171, as disclosed in further detail below.

The hydraulic cylinder 169 is disposed radially outward of (e.g., around, surrounding) the piston retainer 173 and the piston 171. The hydraulic cylinder 169 is keyed to the piston retainer 173. As such, the piston retainer 173 rotates the hydraulic cylinder 169. However, the hydraulic cylinder 169 is slidable along the piston retainer 173 in the axial direction A (left and right in FIG. 2). This movement is used to change the pitch of the plurality of propulsor blades 154. In particular, the hydraulic cylinder 169 includes a yoke 175 that slides axially along the piston retainer 173. The hydraulic cylinder 169 (via the yoke 175) is coupled to the actuation arm 168 of each of the plurality of trunnions 163 such that the hydraulic cylinder 169 is coupled to the plurality of propulsor blades 154 via the trunnion mechanism 161. The propulsor actuation system 158 can be activated to move the yoke 175 of the hydraulic cylinder 169 axially (left or right in FIG. 2), which causes the plurality of trunnion links 167 to rotate the plurality of trunnions 163, which rotates the plurality of propulsor blades 154 about the blade pitch axis P. As such, movement of the hydraulic cylinder 169 causes all of the propulsor blades 154 to rotate (e.g., pitch) simultaneously. When the hydraulic cylinder 169 is moved in a first axial direction (the forward direction, or to the left in FIG. 2), the plurality of propulsor blades 154 is rotated to a first end position (e.g., a feather position), and, when the hydraulic cylinder 169 is moved in a second axial direction (the rearward direction, or to the right in FIG. 2), the plurality of propulsor blades 154 is rotated away from the first end position and toward a second end position (e.g., a reverse position). However, in other embodiments, the propulsor actuation system 158 can be configured so that the movement of the hydraulic cylinder 169 is reversed.

The propulsor actuation system 158 includes a minimum pitch lockout system 200 that prevents the yoke 175 of the hydraulic cylinder 169 from moving beyond a predetermined axial position. In particular, the minimum pitch lockout system 200 includes a locking mechanism 202 that closes to a closed position to prevent the yoke 175 from moving axially beyond the predetermined axial position, as detailed further below. The predetermined axial position corresponds to a predetermined minimum pitch for the plurality of propulsor blades 154 during a flight of the aircraft on which the turbine engine 110 is mounted. In one embodiment, the predetermined minimum pitch is thirty-five degrees (35°). In this way, the propulsor actuation system 158 can pitch the plurality of propulsor blades 154 in a first pitch range from the feather position to the predetermined minimum pitch during the flight when the locking mechanism 202 is in the closed position. In some embodiments, the feather position can be a pitch of ninety degrees (90°).

The minimum pitch lockout system 200 can move the locking mechanism 202 to an open position to allow the yoke 175 to move axially beyond the predetermined axial position, as detailed further below. In this way, the propulsor actuation system 158 can pitch the plurality of propulsor blades 154 to a second pitch range that is less than the predetermined minimum pitch when the locking mechanism 202 is in the open position. In particular, the propulsor actuation system 158 can pitch the plurality of propulsor blades 154 to a reverse thrust position such that the pitch is a negative pitch (e.g., less than zero). The second pitch range is less than the predetermined minimum pitch. In some embodiments, the second pitch range is from the predetermined minimum pitch, for example, thirty-five degrees (35°), to negative ninety degrees to (−90°). In some embodiments, the second pitch range is from the predetermined minimum pitch to negative fifteen degrees (−15°).

The minimum pitch lockout system 200 includes a locking mechanism actuator 204 and an electric power supply 205 for providing electric power to the locking mechanism 202 to actuate the locking mechanism 202. The locking mechanism actuator 204 is a solenoid that includes an electromagnet formed by a helical coil of wire and converts electrical energy (e.g., electric power) into mechanical work through electromagnetic forces. In particular, the locking mechanism actuator 204 receives electric power from the electric power supply 205 and actuates the locking mechanism 202 to open the locking mechanism 202, as detailed further below. The locking mechanism actuator 204 can include any electromechanical actuator for actuating the locking mechanism 202. The locking mechanism actuator 204 is coupled to the locking mechanism 202 such that the locking mechanism actuator 204 rotates with rotation of the propulsor shaft 156. In this way, the locking mechanism actuator 204 is positioned in the rotating reference frame of the propulsor shaft 156 (e.g., the propulsor actuation system 158). Such a configuration allows the locking mechanism actuator 204 to actuate the locking mechanism 202 while the propulsor actuation system 158 is rotating with the fan shaft 156.

The electric power supply 205 is a slip ring that includes an electromechanical device that transmits electric power from a stationary component (e.g., a static component of the turbine engine 110) to a rotating component (e.g., the disk 143). In this way, the electric power supply 205 is an electrical generator that generates electric power similar to the electric machine 190 (FIG. 1). The electric power supply 205 supplies the electric power to the locking mechanism actuator 204 to actuate the locking mechanism 202, as detailed further below. The electric power supply 205 can include any type of electrical generator or electric power supply (e.g., batteries, auxiliary power unit, or the like) for supplying electric power to the minimum pitch lockout system 200.

Figure 3:
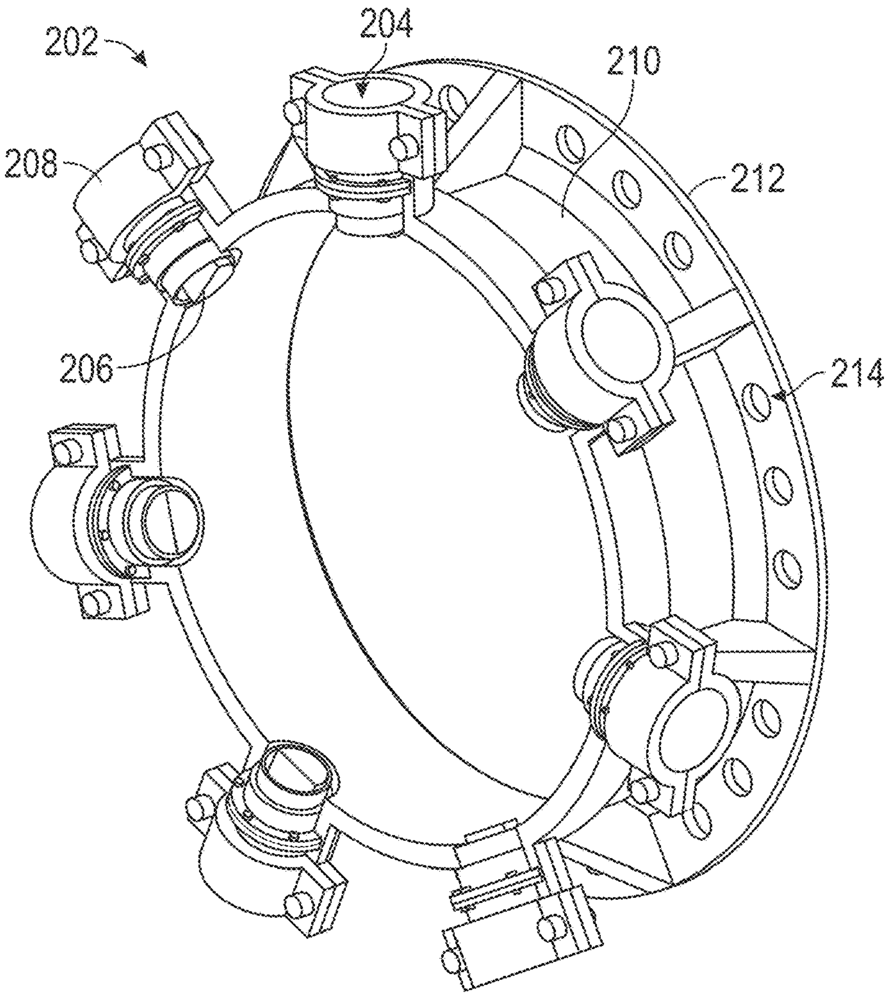
FIG. 3 is an isometric view of a locking mechanism for a minimum pitch lockout system, isolated from the propulsor actuation system of FIG. 2, according to the present disclosure.

FIG. 3 is an isometric view of the locking mechanism 202 for the minimum pitch lockout system 200 (FIG. 2), isolated from the propulsor actuation system 158 (FIG. 2), according to the present disclosure. The locking mechanism 202 includes one or more pins 206. Each of the pins 206 is disposed in a pin housing 208 of a respective locking mechanism actuator 204. Each of the pins 206 moves in and out of the pin housing 208 to open and to close the locking mechanism 202, as detailed further below. The locking mechanism 202 includes a pin support 210 that is annular about the longitudinal centerline axis 112 (FIG. 2). The pin housing 208 of each of the pins 206 extends from the pin support 210. In FIG. 3, the pin housing 208 is coupled to the pin support 210. In some embodiments, the pin housing 208 is formed with the pin support 210 such that the pin housing 208 and the pin support 210 form a single, unitary component. The pins 206 are spaced circumferentially about the pin support 210.

The locking mechanism 202 also includes a coupling portion 212 for coupling the locking mechanism 202 to the actuators 159 (e.g., to the fan shaft 156) such that the locking mechanism 202 rotates with the actuators 159. In FIG. 3, the coupling portion 212 is a flange and includes one or more apertures 214 for receiving a fastening mechanism to couple the locking mechanism 202 to the actuators 159.

Figure 4A:
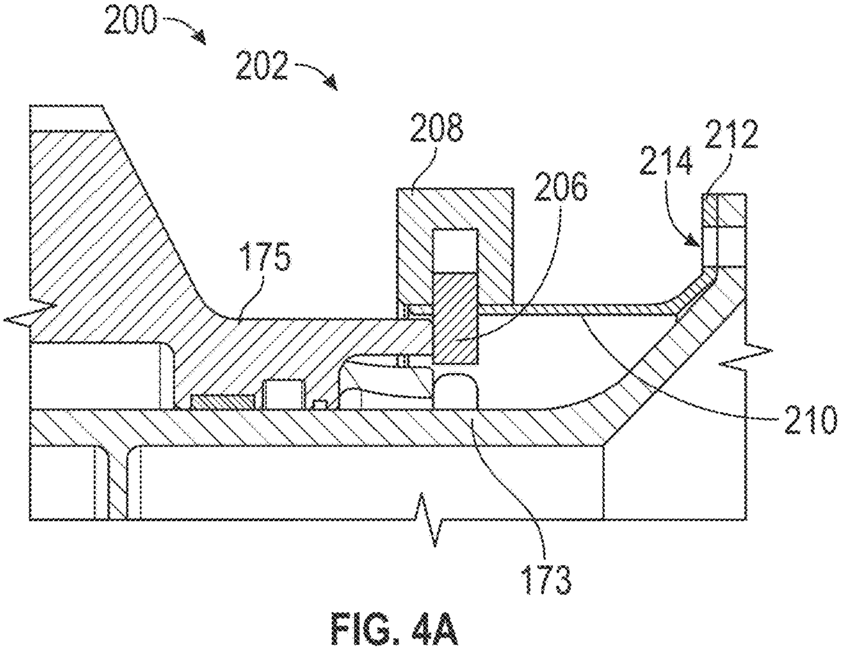
FIG. 4A is a partial, schematic, cross-sectional view of the propulsor actuation system having the locking mechanism in a closed position and a yoke of the propulsor actuation system in a minimum pitch position, taken at detail 4A in FIG. 2, according to the present disclosure.
Figure 4B:
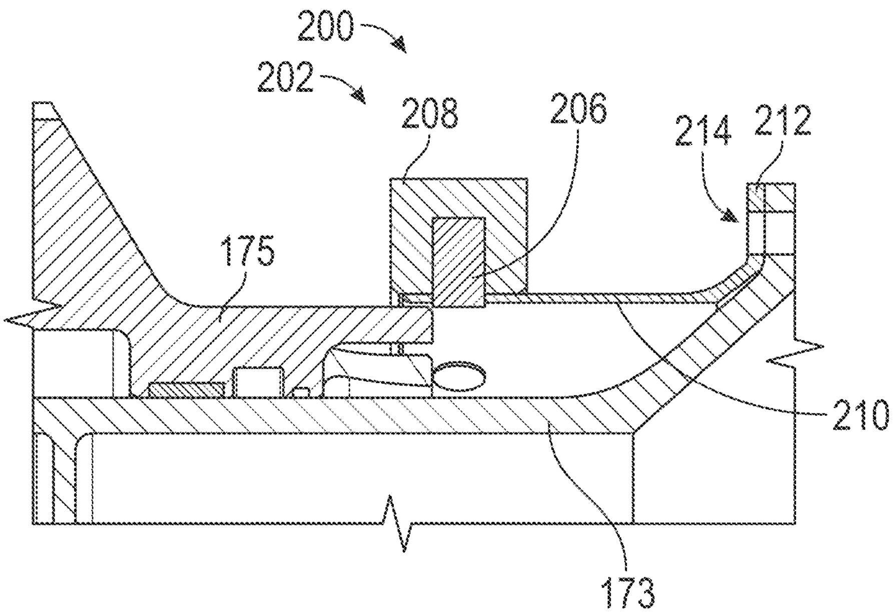
FIG. 4B is a partial, schematic, cross-sectional view of the propulsor actuation system of FIG. 4A having the locking mechanism in an opened position with the yoke in the minimum pitch position, according to the present disclosure.
Figure 4C:
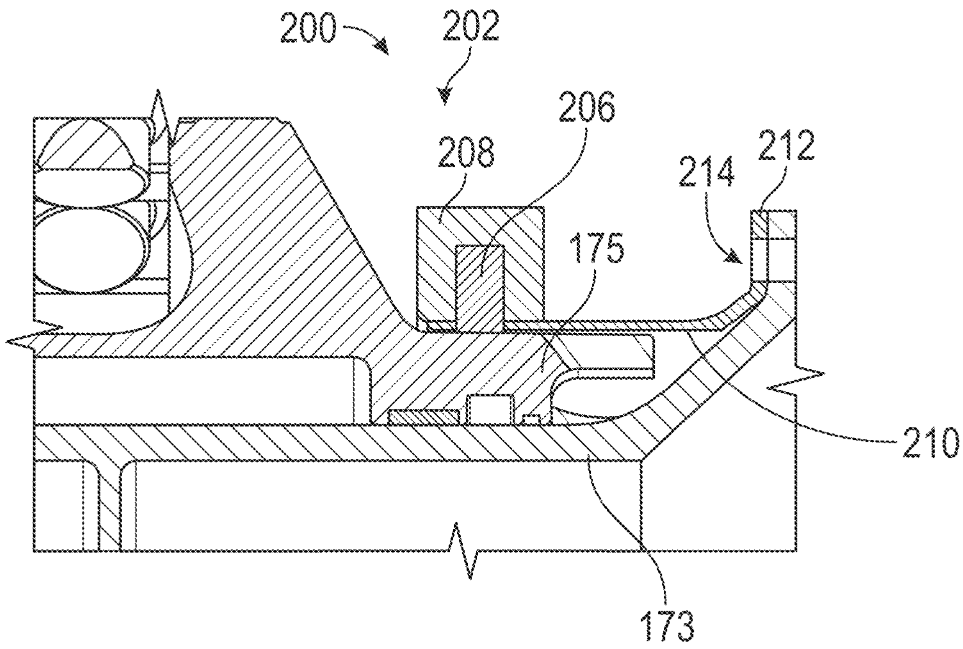
FIG. 4C is a partial, schematic, cross-sectional view of the propulsor actuation system of FIG. 4A having the locking mechanism in an opened position with the yoke in a reverse pitch position, according to the present disclosure.

FIG. 4A shows the locking mechanism 202 in the closed position and the yoke 175 in the minimum pitch position. FIG. 4B shows the locking mechanism 202 in the open position with the yoke 175 in the minimum pitch position. FIG. 4C shows the locking mechanism 202 in an open position with the yoke 175 in the reverse pitch position.

Figure 5:
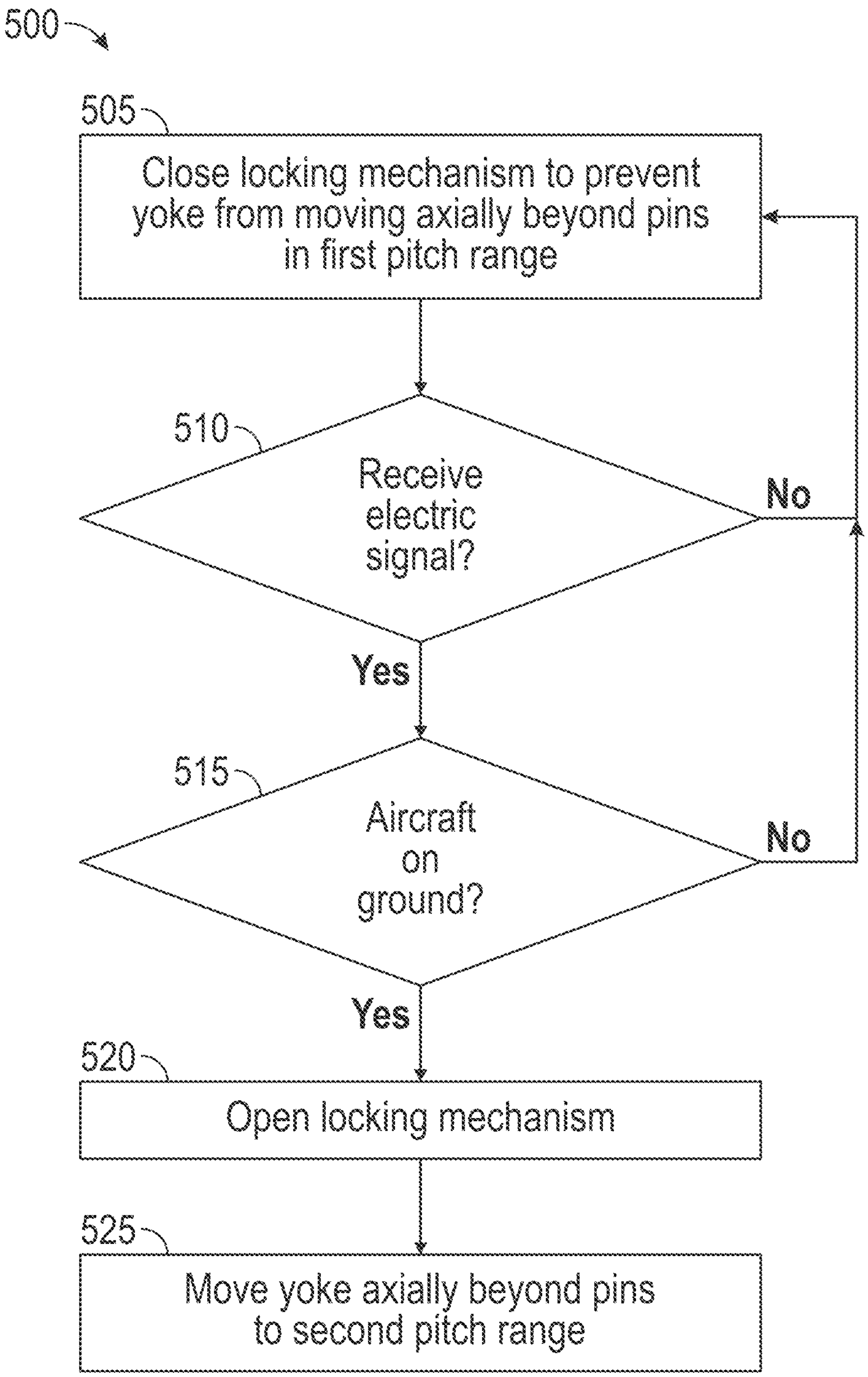
FIG. 5 is a flowchart showing a method of operating a propulsor actuation system, according to the present disclosure.

FIG. 5 is a flowchart showing a method 500 of operating the propulsor actuation system 158, according to the present disclosure. In describing the method 500, reference will be made to FIGS. 4A to 4C.

In step 505, the method 500 includes closing the locking mechanism 202 (e.g., to the closed position of FIG. 4A) to prevent the yoke 175 from moving axially beyond the pins 206 in the first pitch range. In particular, the controller 198 controls the locking mechanism 202 to extend the pins 206 towards the piston retainer 173. The locking mechanism actuator 204 biases the pins 206 to the closed position. When the locking mechanism 202 is in the closed position (e.g., the pins 206 are extended), the propulsor actuation system 158 can control the actuators 159 to change the pitch of the propulsor blades 154 in the first pitch range. In particular, the propulsor actuation system 158 can change the pitch of the propulsor blades 154 between the feather position and the minimum pitch position. The locking mechanism 202 prevents the propulsor blades 154 from being pitched below the minimum pitch position. In particular, the pins 206 prevent the yoke 175 from moving axially beyond the pins 206, such that the yoke 175 cannot move axially beyond the pins 206 to prevent the propulsor actuation system 158 from changing the pitch of the propulsor blades 154 to less than the minimum pitch position. Thus, while the aircraft is in flight, the propulsor actuation system 158 is prevented from changing the pitch to less than the minimum pitch position.

In step 510, the method 500 includes determining whether an electric signal is received. In particular, the controller 198 determines whether the electric power supply 205 sends the electric signal to the locking mechanism actuator 204. For example, a pilot can send a reverse thrust command to the controller 198 via a button, a switch, or the like. In this way, the controller 198 receives an input to actuate the locking mechanism 202. The controller 198 can then control the electric power supply 205 to send electricity to the locking mechanism actuator 204. If the electric power supply 205 is not sending electricity to the locking mechanism actuator 204 (Step 510: NO), then the method 500 continues back to step 505 to keep the locking mechanism 202 in the closed position. In this way, the locking mechanism 202 is biased to the closed position unless the locking mechanism actuator 204 receives electricity.

In step 515, if the locking mechanism actuator 204 receives electricity (e.g., from the electric power supply 205) (Step 510: YES), then the method 500 includes determining whether the aircraft is on the ground. To determine whether the aircraft is on the ground, the controller 198 receives one or more sensor signals, such as, for example, weight on wheels sensors, to determine there is weight on the wheels. Weight on wheels corresponds to the aircraft being on the ground as there is a reaction force from the ground on the wheels when the aircraft is on the ground. If the aircraft is not on the ground (e.g., the aircraft is in flight) (Step 515: NO), then the method 500 proceeds to step 505 and the locking mechanism 202 remains in the closed position.

In step 520, if the aircraft is on the ground (Step 515: YES), the method 500 includes opening the locking mechanism 202. In particular, the locking mechanism actuator 204 receives the electricity from the electric power supply 205 and actuates the pins 206 to retract the pins 206 into the pin housing 208. In this way, the locking mechanism 202 moves to the open position as shown in FIG. 4B. When the locking mechanism 202 is in the open position, the yoke 175 can move axially beyond the pins 206.

In step 525, the method 500 includes moving the yoke axially beyond the pins 206 to change the pitch of the propulsor blades 154 to a pitch in the second pitch range. In particular, the controller 198 controls the actuators 159 to move the yoke 175 axially beyond the pins 206 to change the pitch of the propulsor blades 154. In this way, the propulsor actuation system 158 can change the pitch of the propulsor to the second pitch range, less than the first pitch range (e.g., less than the minimum pitch position). As detailed above, the second pitch range corresponds to a reverse thrust position of the propulsor blades 154 for generating the reverse thrust. In this way, the turbine engine 110 (FIG. 1) can change the pitch of the propulsor blades 154 to the reverse thrust position when the aircraft is on the ground (e.g., lands).

Figure 6:
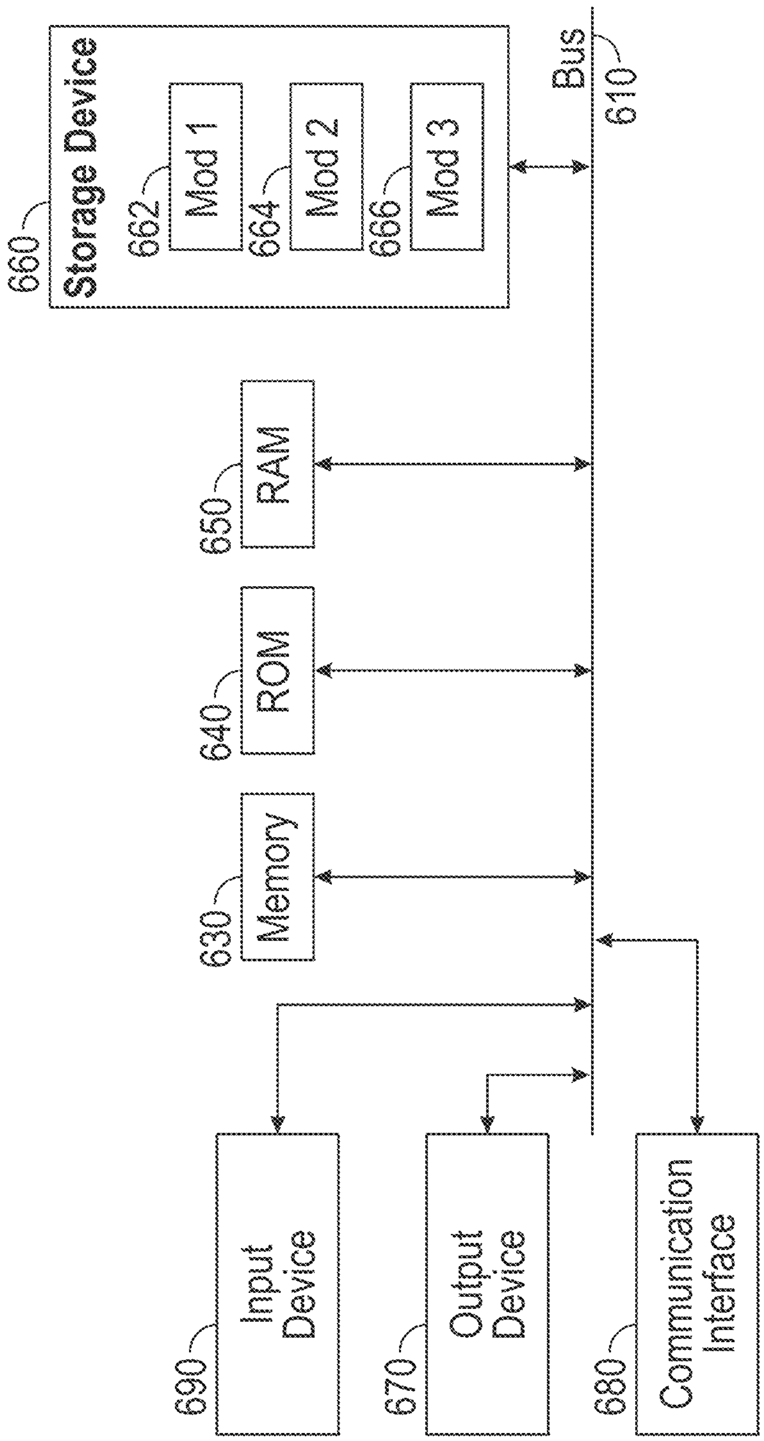
FIG. 6 is an exemplary computing system, according to the present disclosure.

FIG. 6 shows a computing system 600, according to the present disclosure. The computing system 600 may carry out any of the methods or systems described herein. The controllers described previously herein may be operated according to the computing system 600. The computing system 600 includes a general-purpose computing device, including a central processing unit (CPU), or a processor 620, and a system bus 610 that couples various system components, including a system memory 630 such as a read-only memory (ROM) 640 and a random-access memory (RAM) 650, to the processor 620. The computing system 600 can include a cache of high-speed memory connected directly with, in close proximity to, or integrated as part of the processor 620. The computing system 600 copies data from the system memory 630 or the storage device 660 to the cache for quick access by the processor 620. In this way, the cache provides a performance boost that avoids the processor 620 delays while waiting for data. These and other modules can control or be configured to control the processor 620 to perform various actions. Other system memory 630 may be available for use as well. The system memory 630 can include multiple different types of memory with different performance characteristics. The disclosure may operate on a computing system 600 with more than one processor 620 or on a group or a cluster of computing devices networked together to provide greater processing capability. The processor 620 can include any general-purpose processor and a hardware module or a software module, such as module 1 662, module 2 664, and module 3 666 stored in the storage device 660, configured to control the processor 620, as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures, including a memory bus or a memory controller, a peripheral bus, and a local bus using any of a variety of bus architectures. A basic input/output system (BIOS) stored in the ROM 640, or the like, may provide the basic routine that helps to transfer information between elements within the computing system 600, such as during start-up. The computing system 600 further includes one or more storage devices 660 such as a hard disk drive, a magnetic disk drive, an optical disk drive, a tape drive, or the like. The storage devices 660 can include software modules 662, 664, and 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules, and other data for the computing system 600. In one aspect, a hardware module that performs a particular function includes the software component stored in a tangible computer-readable storage medium in connection with the necessary hardware components, such as the processor 620, the system bus 610, the output device 670, and so forth, to carry out the function. In another aspect, the computing system 600 can use a processor and a computer-readable storage medium to store instructions that, when executed by a processor (e.g., one or more processors), cause the processor to perform a method or other specific actions. The basic components and appropriate variations are contemplated depending on the type of device, such as whether the computing system 600 is a small, handheld computing device, a desktop computer, or a computer server.

Although the exemplary embodiment described herein employs the storage device 660, other types of computer-readable media that can store data that are accessible by a computer, such as magnetic cassettes, flash memory cards, digital versatile disks, cartridges, random-access memories (RAMs) 650, and a read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 600, an input device 690 represents any number of input mechanisms, such as a microphone for speech, a touch-sensitive screen for a gesture, or graphical input, a keyboard, a mouse, motion input, speech, and so forth. An output device 670 can also be one or more of a number of output mechanisms known to those of skill in the art. In some instances, multimodal systems enable a user to provide multiple types of input to communicate with the computing system 600. The communications interface 680 generally governs and manages the user input and system output. There is no restriction on operating on any particular hardware arrangement and, therefore, the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Accordingly, the propulsor actuation system 158 prevents unintended pitch changes less than the minimum pitch position while the aircraft is in flight. Thus, the propulsor actuation system 158 prevents excessive drag on the propulsor 152 during the flight. The minimum pitch lockout system 200 is particularly useful for propulsor actuation systems without a counterweight that prevents unintended pitch changes. The minimum pitch lockout system 200 can require two signals to actuate the pins 206, such as, for example, the locking mechanism actuator 204 being energized and the signal that the aircraft is on the ground. Such a configuration ensures the pins 206 are not retracted during a flight and cause a hazardous incident. The locking mechanism actuator 204 being in the rotating reference frame of the propulsor actuation system 158 allows the locking mechanism actuator 204 to actuate the pins 206 while the propulsor actuation system 158 is rotating with the fan shaft 156. Further, preventing axial movement with the pins 206 allows for a more precise control of the propulsor actuation system 158 due to lesser deviations per inch of movement in the axial direction as compared to movements in the circumferential direction.

Further aspects are provided by the subject matter of the following clauses.

A propulsor actuation system for a turbine engine has a longitudinal centerline axis and including a propulsor having a plurality of propulsor blades each rotatable about a blade pitch axis, the propulsor actuation system comprising one or more actuators for rotating the plurality of propulsor blades about the blade pitch axis, the one or more actuators including a yoke that extends substantially parallel to the longitudinal centerline axis, and a minimum pitch lockout system comprising a locking mechanism movable to a closed position to prevent the yoke from moving axially beyond the locking mechanism such that the plurality of propulsor blades are rotatable in a first pitch range, and movable to an open position to allow the yoke to move axially beyond the locking mechanism such that the plurality of propulsor blades are rotatable in a second pitch range.

The propulsor actuation system of the preceding clause, further comprising a controller that receives an input to actuate the locking mechanism, controls the locking mechanism to open the locking mechanism to the open position when the controller receives the input, and controls the locking mechanism to close the locking mechanism to the closed position when the controller does not receive the input.

The propulsor actuation system of any preceding clause, the turbine engine being on an aircraft, the propulsor actuation system further comprising a controller that receives an indication that the aircraft is on ground and controls the locking mechanism to open the locking mechanism to the open position when the aircraft is on the ground.

The propulsor actuation system of any preceding clause, the locking mechanism being positioned to prevent the yoke from moving beyond a minimum pitch position that corresponds to a minimum pitch angle of the plurality of propulsor blades when the locking mechanism is in the closed position.

The propulsor actuation system of any preceding clause, the locking mechanism allowing the yoke to move beyond the minimum pitch position in the open position such that the plurality of propulsor blades are rotatable to less than the minimum pitch angle.

The propulsor actuation system of any preceding clause, the minimum pitch lockout system including a locking mechanism actuator that actuates the locking mechanism between the closed position and the open position.

The propulsor actuation system of any preceding clause, the locking mechanism actuator being in a rotating reference frame of the propulsor actuation system such that the locking mechanism actuator is rotatable with the one or more actuators about the longitudinal centerline axis.

The propulsor actuation system of any preceding clause, the minimum pitch lockout system including an electric power supply that supplies electricity to the locking mechanism actuator to open the locking mechanism to the open position and removes the electricity to the locking mechanism actuator to close the locking mechanism.

The propulsor actuation system of any preceding clause, the locking mechanism including one or more pins extendable to close the locking mechanism to the closed position and retractable to open the locking mechanism to the open position.

The propulsor actuation system of any preceding clause, the one or more pins being positioned at an axial location for a minimum pitch angle of the plurality of the propulsor blades.

The propulsor actuation system of any preceding clause, each of the one or more pins being disposed in a pin housing and is movable in and out of the pin housing to open and to close the locking mechanism.

The propulsor actuation system of any preceding clause, the locking mechanism including a pin support, the pin housing of each of the one or more pins extending from the pin support.

The propulsor actuation system of any preceding clause, the pin support being coupled to the one or more actuators such that the locking mechanism is rotatable with the one or more actuators about the longitudinal centerline axis.

A method of operating a propulsor actuation system for a turbine engine having a longitudinal centerline axis and including a propulsor having a plurality of propulsor blades, the method comprising rotating the plurality of propulsor blades about a blade pitch axis with one or more actuators by moving a yoke of the one or more actuators axially, preventing, with a locking mechanism in a closed positioned, the yoke from moving axially beyond the locking mechanism to rotate the plurality of propulsor blades in a first pitch range, opening the locking mechanism to an open position, and moving, while the locking mechanism is in the open position, the yoke axially beyond the locking mechanism to rotate the plurality of propulsor blades in a second pitch range.

The method of any preceding clause, further comprising preventing the yoke from moving axially beyond a minimum pitch position that corresponds to a minimum pitch angle of the plurality of propulsor blades in the first pitch range, when the locking mechanism is in the closed position, and moving the yoke beyond the minimum pitch position when the locking mechanism is in the open position, such that the plurality of propulsor blades is rotatable to less than the minimum pitch angle in the second pitch range.

The method of any preceding clause, the locking mechanism including one or more pins, the method further comprising extending the one or more pins to close the locking mechanism to the closed position and retracting the one or more pins to open the locking mechanism to the open position.

The method of any preceding clause, further comprising receiving an input to actuate the locking mechanism, opening the locking mechanism to the open position based on the input, and, closing the locking mechanism to the closed position when the input is not received.

The method of any preceding clause, the turbine engine being on an aircraft, the method further comprising receiving an indication that the aircraft is on ground and opening the locking mechanism to the open position when the aircraft is on the ground.

The method of any preceding clause, further comprising actuating the locking mechanism between the closed position and the open position with a locking mechanism actuator, and rotating the locking mechanism actuator about the longitudinal centerline axis with the one or more actuators.

The method of any preceding clause, further comprising supplying, with an electric power supply, electricity to the locking mechanism actuator to open the locking mechanism to the open position, and removing the electricity to close the locking mechanism to the closed position.

A turbine engine having a longitudinal centerline axis. The turbine engine comprises a propulsor having a plurality of propulsor blades coupled to a propulsor shaft and each rotatable about a blade pitch axis and a turbo-engine having a turbine shaft that is drivingly coupled to the propulsor shaft, and a propulsor actuation system. The propulsor actuation system comprises one or more actuators for rotating the plurality of propulsor blades about the blade pitch axis, the one or more actuators including a yoke that extends substantially parallel to the longitudinal centerline axis, and a minimum pitch lockout system comprising a locking mechanism movable to a closed position to prevent the yoke from moving axially beyond the locking mechanism such that the plurality of propulsor blades are rotatable in a first pitch range, and movable to an open position to allow the yoke to move axially beyond the locking mechanism such that the plurality of propulsor blades are rotatable in a second pitch range.

The turbine engine of the preceding clause, further comprising a controller that receives an input to actuate the locking mechanism, controls the locking mechanism to open the locking mechanism to the open position when the controller receives the input, and controls the locking mechanism to close the locking mechanism to the closed position when the controller does not receive the input.

The turbine engine of any preceding clause, the turbine engine being on an aircraft, the propulsor actuation system further comprising a controller that receives an indication that the aircraft is on ground and controls the locking mechanism to open the locking mechanism to the open position when the aircraft is on the ground.

The turbine engine of any preceding clause, the locking mechanism being positioned to prevent the yoke from moving beyond a minimum pitch position that corresponds to a minimum pitch angle of the plurality of propulsor blades when the locking mechanism is in the closed position.

The turbine engine of any preceding clause, the locking mechanism allowing the yoke to move beyond the minimum pitch position in the open position such that the plurality of propulsor blades are rotatable to less than the minimum pitch angle.

The turbine engine of any preceding clause, the minimum pitch lockout system including a locking mechanism actuator that actuates the locking mechanism between the closed position and the open position.

The turbine engine of any preceding clause, the locking mechanism actuator being in a rotating reference frame of the propulsor actuation system such that the locking mechanism actuator is rotatable with the one or more actuators about the longitudinal centerline axis.

The turbine engine of any preceding clause, the minimum pitch lockout system including an electric power supply that supplies electricity to the locking mechanism actuator to open the locking mechanism to the open position and removes the electricity to the locking mechanism actuator to close the locking mechanism.

The turbine engine of any preceding clause, the locking mechanism including one or more pins extendable to close the locking mechanism to the closed position and retractable to open the locking mechanism to the open position.

The turbine engine of any preceding clause, the one or more pins being positioned at an axial location for a minimum pitch angle of the plurality of the propulsor blades.

The turbine engine of any preceding clause, each of the one or more pins being disposed in a pin housing and is movable in and out of the pin housing to open and to close the locking mechanism.

The turbine engine of any preceding clause, the locking mechanism including a pin support, the pin housing of each of the one or more pins extending from the pin support.

The turbine engine of any preceding clause, the pin support being coupled to the one or more actuators such that the locking mechanism is rotatable with the one or more actuators about the longitudinal centerline axis.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A propulsor actuation system for a turbine engine having a longitudinal centerline axis and including a propulsor having a plurality of propulsor blades each rotatable about a blade pitch axis, the propulsor actuation system comprising:

one or more actuators for rotating the plurality of propulsor blades about the blade pitch axis, the one or more actuators including a yoke coupled to the plurality of propulsor blades and configured to move axially, the yoke extending substantially parallel to the longitudinal centerline axis; and a minimum pitch lockout system comprising a locking mechanism disposed radially outward of the yoke, the locking mechanism configured to extend radially inward to a closed position to prevent the yoke from moving axially beyond the locking mechanism such that the plurality of propulsor blades are rotatable in a first pitch range, and the locking mechanism configured to retract radially outward to an open position to allow the yoke to move axially beyond the locking mechanism such that the plurality of propulsor blades are rotatable in a second pitch range different from the first pitch range.

2. The propulsor actuation system of claim 1, further comprising a controller that receives an input to actuate the locking mechanism, controls the locking mechanism to open the locking mechanism to the open position when the controller receives the input, and controls the locking mechanism to close the locking mechanism to the closed position when the controller does not receive the input.

3. The propulsor actuation system of claim 1, wherein the turbine engine is on an aircraft, the propulsor actuation system further comprising a controller that receives an indication that the aircraft is on ground and controls the locking mechanism to open the locking mechanism to the open position when the aircraft is on the ground.

4. The propulsor actuation system of claim 1, wherein, in the closed position, the locking mechanism is positioned to prevent the yoke from moving beyond a minimum pitch position that corresponds to a minimum pitch angle of the plurality of propulsor blades in the first pitch range.

5. The propulsor actuation system of claim 4, wherein, in the open position, the locking mechanism allows the yoke to move beyond the minimum pitch position such that the plurality of propulsor blades is rotatable within the second pitch range, the second pitch range being less than the first pitch range.

6. The propulsor actuation system of claim 1, wherein the minimum pitch lockout system includes a locking mechanism actuator that actuates the locking mechanism between the closed position and the open position.

7. The propulsor actuation system of claim 6, wherein the locking mechanism actuator is in a rotating reference frame of the propulsor actuation system such that the locking mechanism actuator is rotatable with the one or more actuators about the longitudinal centerline axis.

8. The propulsor actuation system of claim 6, wherein the minimum pitch lockout system includes an electric power supply that supplies electricity to the locking mechanism actuator to open the locking mechanism to the open position and removes the electricity to the locking mechanism actuator to close the locking mechanism.

9. The propulsor actuation system of claim 1, wherein the locking mechanism includes one or more pins that extend radially inward to the closed position and retract radially outward to the open position.

10. The propulsor actuation system of claim 9, wherein the one or more pins are positioned at an axial location corresponding to a minimum pitch angle of the plurality of the propulsor blades.

11. The propulsor actuation system of claim 9, wherein each of the one or more pins is disposed in a pin housing, the one or more pins extending from the pin housing to the closed position and retracting into the pin housing to the open position.

12. The propulsor actuation system of claim 11, wherein the locking mechanism includes a pin support, the pin housing of each of the one or more pins extending from the pin support.

13. The propulsor actuation system of claim 12, wherein the pin support is coupled to the one or more actuators such that the locking mechanism is rotatable with the one or more actuators about the longitudinal centerline axis.

14. A method of operating a propulsor actuation system for a turbine engine having a longitudinal centerline axis and including a propulsor having a plurality of propulsor blades, the method comprising:

rotating the plurality of propulsor blades about a blade pitch axis with one or more actuators by moving a yoke of the one or more actuators axially, the yoke extending substantially parallel to the longitudinal centerline axis and coupled to the plurality of propulsor blades;

preventing, with a locking mechanism disposed radially outward of the yoke and configured to extend radially inward to a closed position, the yoke from moving axially beyond the locking mechanism to rotate the plurality of propulsor blades in a first pitch range;

retracting the locking mechanism radially outwards to an open position; and moving, while the locking mechanism is in the open position, the yoke axially beyond the locking mechanism to rotate the plurality of propulsor blades in a second pitch range different from the first pitch range.

15. The method of claim 14, further comprising preventing the yoke from moving axially beyond a minimum pitch position that corresponds to a minimum pitch angle of the plurality of propulsor blades in the first pitch range, when the locking mechanism is in the closed position, and moving the yoke beyond the minimum pitch position when the locking mechanism is in the open position, such that the plurality of propulsor blades is rotatable within the second pitch range, the second pitch range being less than the first pitch range.

16. The method of claim 14, wherein the locking mechanism includes one or more pins, the method further comprising extending the one or more pins radially inward to close the locking mechanism to the closed position and retracting the one or more pins radially outward to open the locking mechanism to the open position.

17. The method of claim 14, further comprising receiving an input to actuate the locking mechanism, opening the locking mechanism to the open position based on the input, and, closing the locking mechanism to the closed position when the input is not received.

18. The method of claim 14, wherein the turbine engine is on an aircraft, the method further comprising receiving an indication that the aircraft is on ground and opening the locking mechanism to the open position when the aircraft is on the ground.

19. The method of claim 14, further comprising actuating the locking mechanism between the closed position and the open position with a locking mechanism actuator, and rotating the locking mechanism actuator about the longitudinal centerline axis with the one or more actuators.

20. The method of claim 19, further comprising supplying, with an electric power supply, electricity to the locking mechanism actuator to open the locking mechanism to the open position, and removing the electricity to close the locking mechanism to the closed position.

* * * * *